INVENTOR.
ERIC V. BERGSTROM

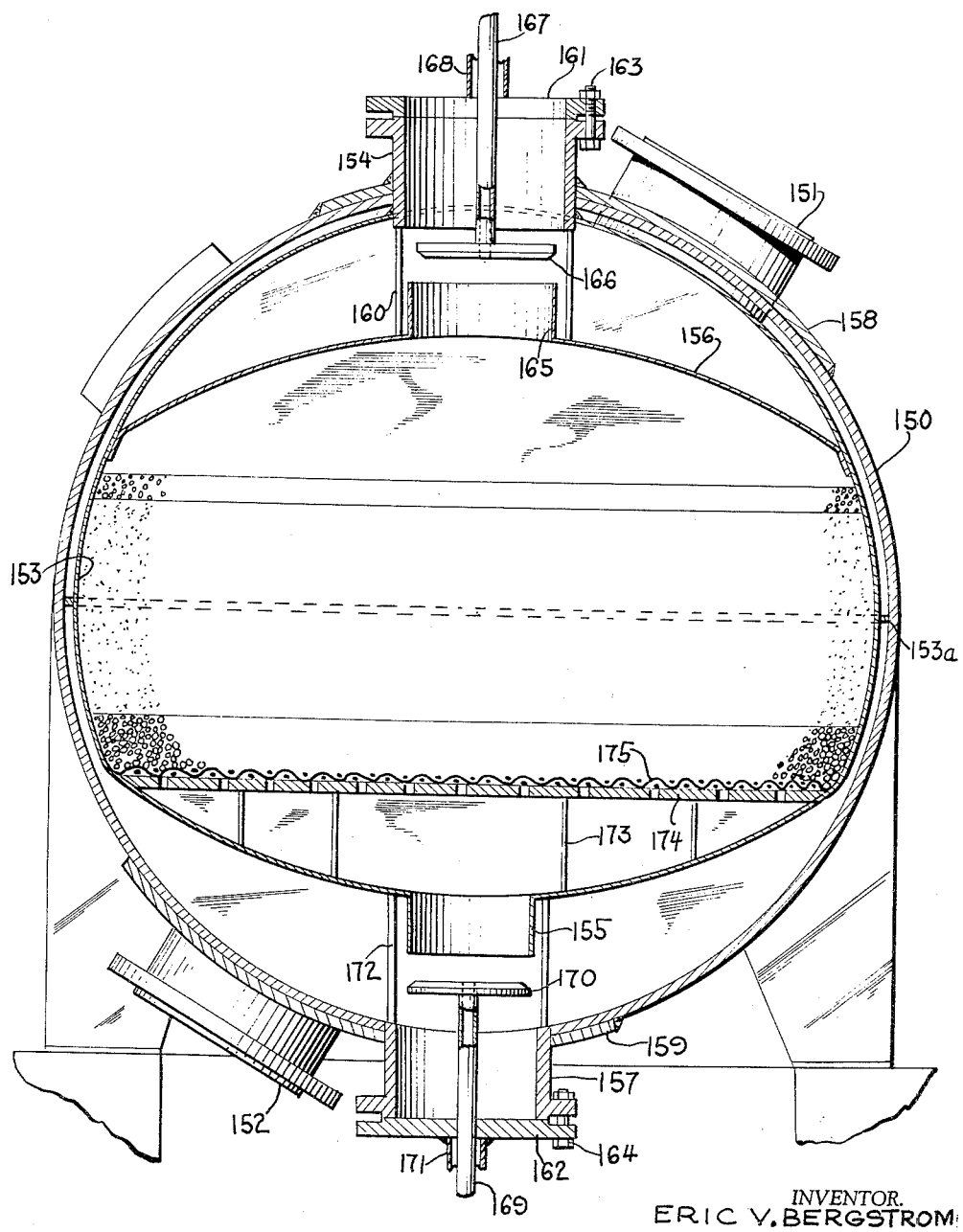

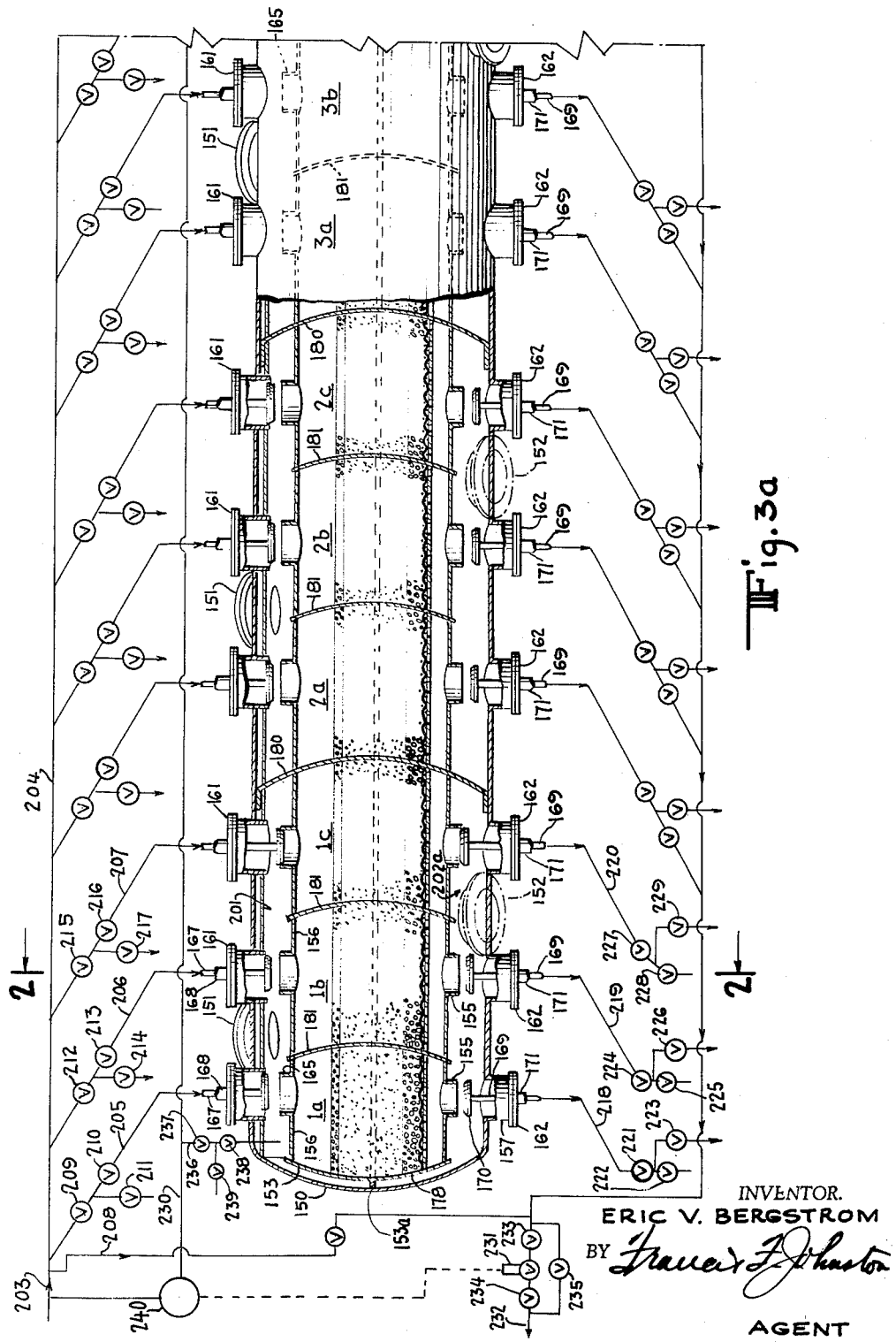

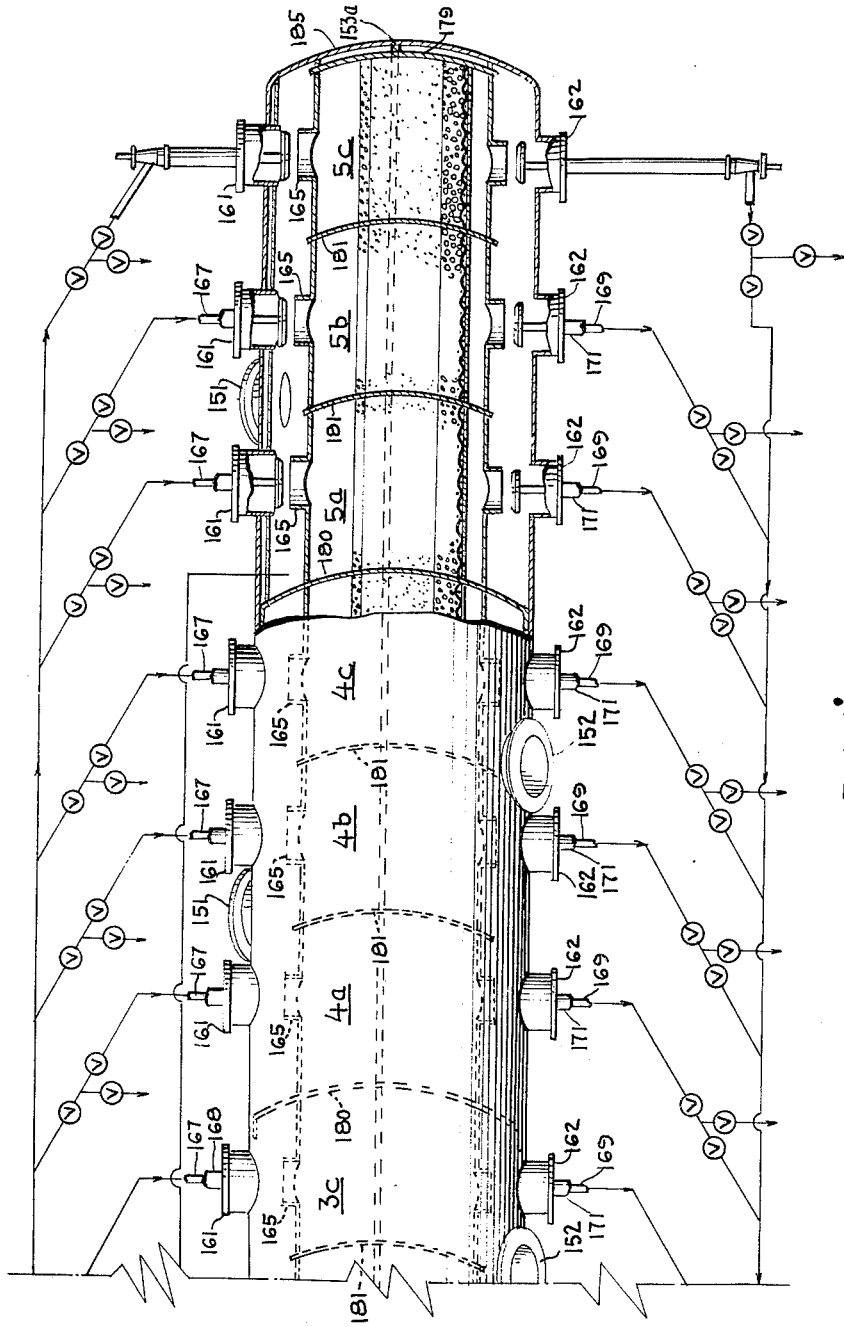

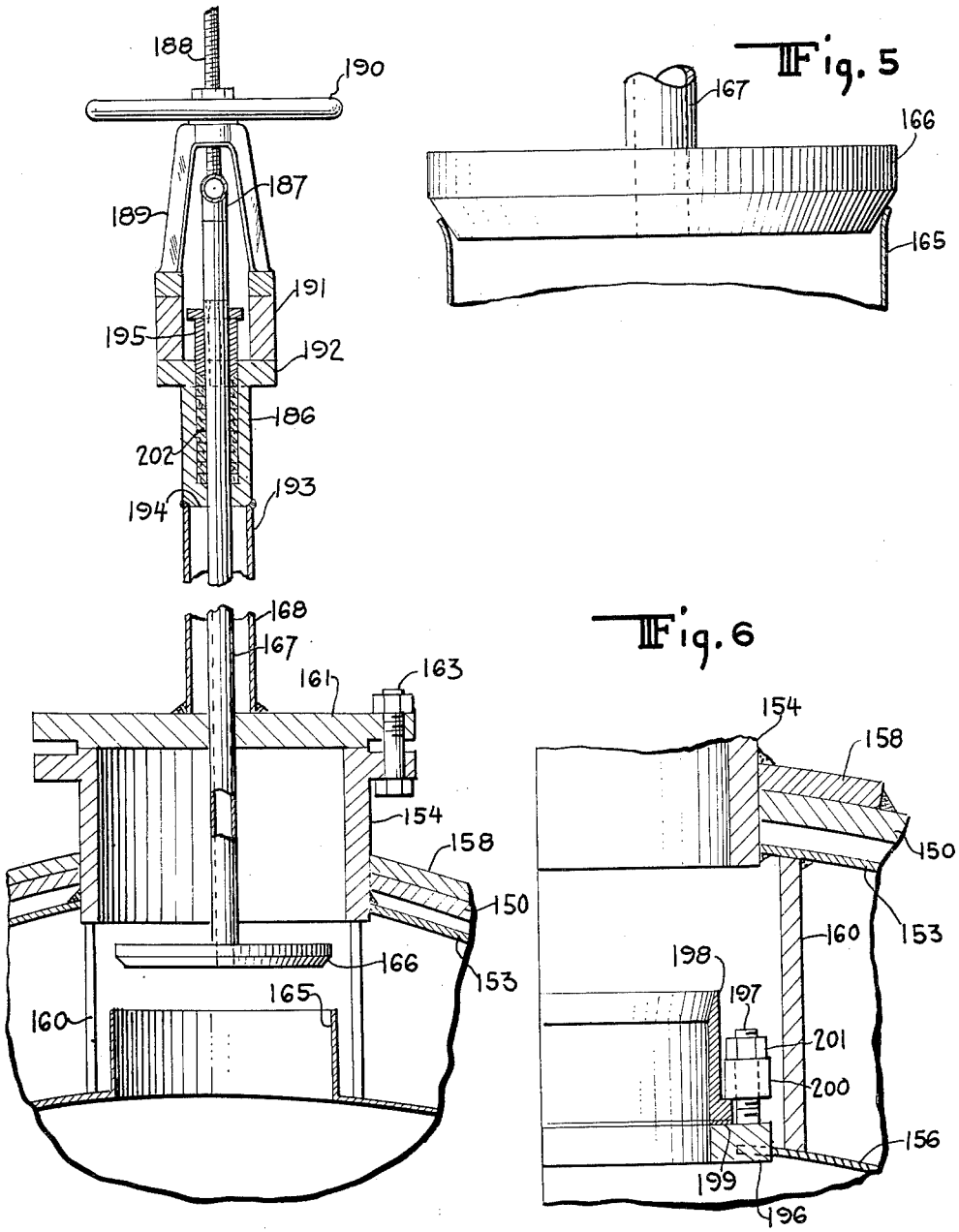

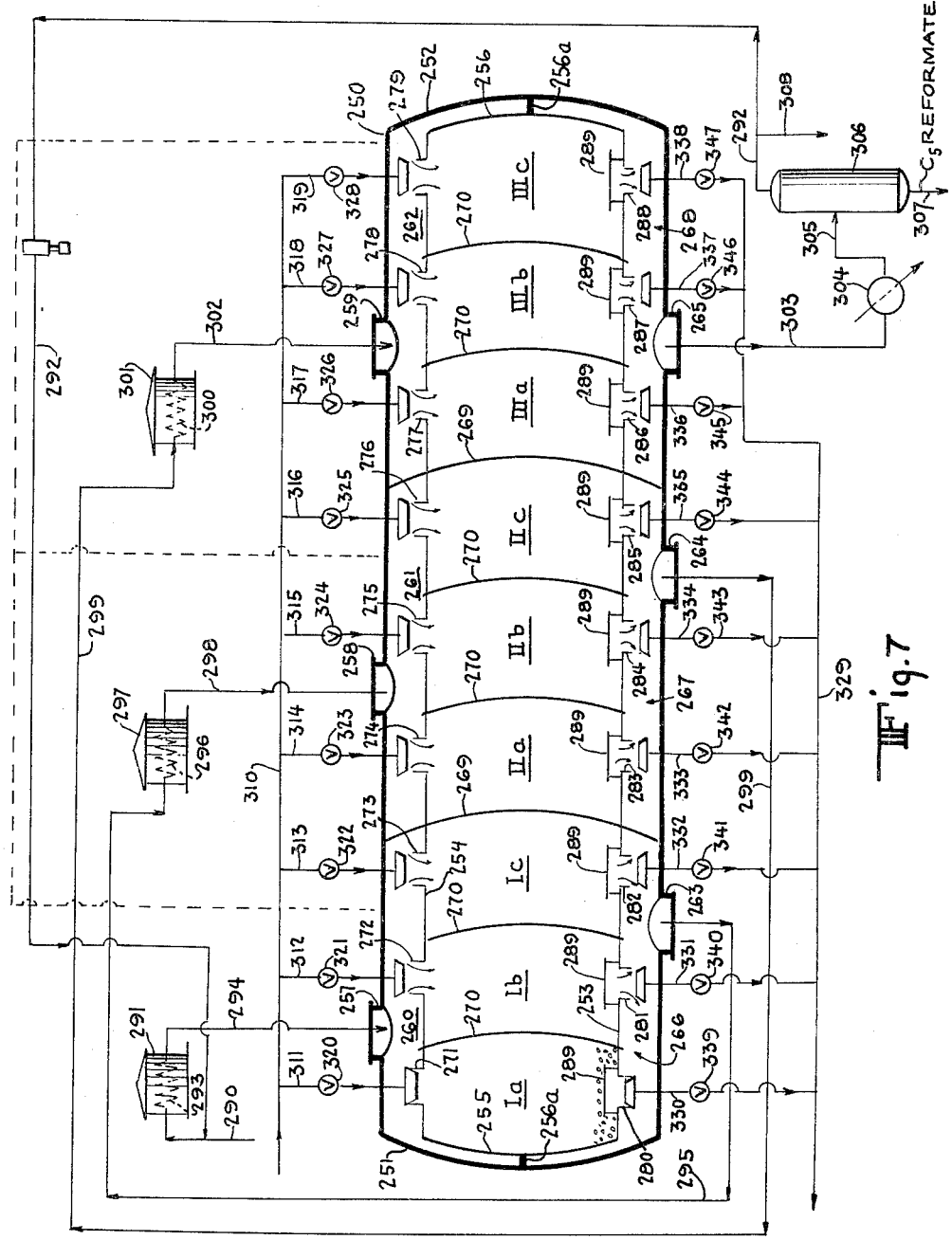

Dec. 18, 1962 E. V. BERGSTROM 3,069,348
MULTI-STAGE, MULTI-ZONE STATIC BED REFORMING
PROCESS AND APPARATUS THEREFOR
Filed July 22, 1959 7 Sheets-Sheet 7
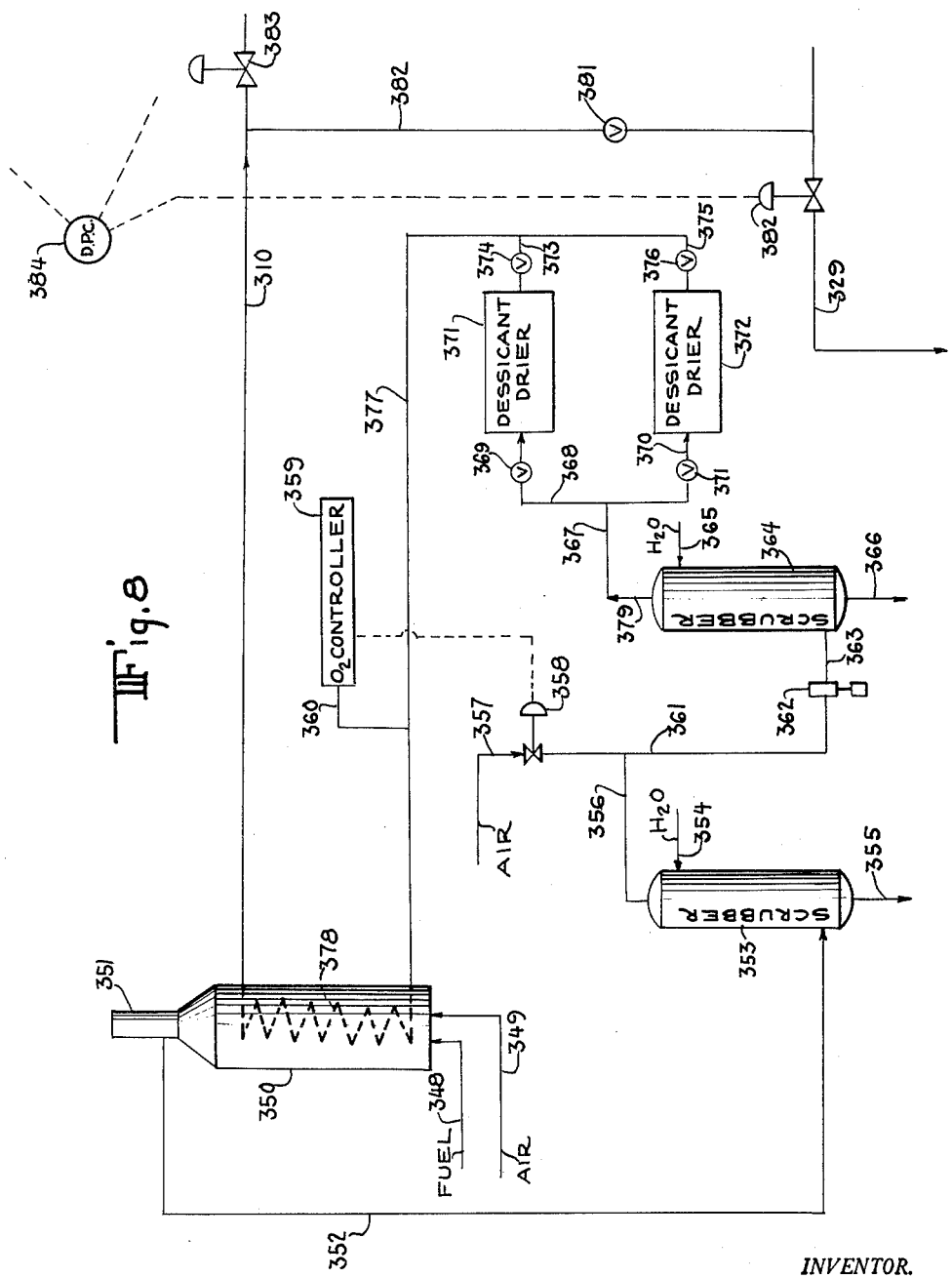
INVENTOR.
ERIC V BERGSTROM
BY Francis F Johnston
AGENT United States Patent Office 3,069,348
Patented Dec. 18, 1962

3,069,348
MULTI-STAGE, MULTI-ZONE STATIC BED REFORMING PROCESS AND APPARATUS THEREFOR
Eric V. Bergstrom, Byram, Conn., assignor to Socony Mobil Oil Company, Inc., a corporation of New York
Filed July 22, 1959, Ser. No. 828,780
7 Claims. (Cl. 208—64)

The present invention relates to reforming and, more particularly, to reforming using a platinum-group metal particle-form solid catalyst and reaction pressures of the order of about 300 pounds per square inch gauge (p.s.i.g.) or less.

Reforming is the term used to designate the end result of the individual reactions of dehydrogenation of naphthenes, dehydrocyclization, and isomerization of paraffins. Theoretically, dehydrogenation of the paraffins to olefins precedes cyclization of the olefins to form aromatics. Regardless of whether in actuality the reactions of dehydrogenation, dehydrocyclization, and isomerization are isolated reactions or successive reactions or not, the upgrading of naphtha presently is the principal practical use of reforming. Accordingly, when the term reforming is used hereinafter it will be used to designate an operation in which naphtha is upgraded by raising the octane rating (Research or clear) of naphtha. A reforming catalyst is a catalytic material employed in reforming or upgrading naphtha. A platinum-group reforming catalyst is a catalyst comprising a carrier or support of refractory oxide such as alumina, silica, zirconia, boria and the like for a metal of the platinum group of metals, i.e., platinum, palladium, iridium, etc.

Space velocity or liquid hourly space velocity is the term designating the volume of reformer charge stock or naphtha per hour contacting a volume of catalyst, the volume of catalyst being the volume of the reactor which is occupied by the reforming catalyst.

Presently, the preponderant portion of reforming units employing a particle-form, solid, platinum-group reforming catalyst are units operating under reactor pressures of at least 500 p.s.i.g. Substantially all of the aforesaid units operate for on-stream periods in excess of three months when the on-stream period is not interrupted by reason of mechanical failure or deactivation of the catalyst by reason of causes other than the deposition of a carbonaceous material commonly designated coke. In fact, many of the aforementioned reforming units have been operating for on-stream periods of a year or more. The catalyst employed in these units is usually termed a non-regenerable platinum catalyst and the operation is usually termed a non-regenerating type of reforming although the catalyst when deactivated only by the deposition of coke can usually be regenerated.

The platinum-group metal reforming catalyst used in these reforming units operating at pressures of 500 p.s.i.g. or more can also be used for reforming at pressures below 500 p.s.i.g. However, at pressures much below, e.g., 100 to 200 p.s.i. below, the catalyst must be regenerated at intervals of from 12 to 240 hours, while reforming at pressures at 300 p.s.i.g. or lower produces better yields of reformate having a given octane rating than reforming the same naphtha over the same platinum-metal group catalyst at pressures of 500 p.s.i.g. or more the necessary frequent regeneration is an economic disadvantage.

In order to provide for continuous operation and the frequent regeneration, it has been the practice to employ six reactors, five of which are on-stream while the sixth or swing reactor replaces the reactor being regenerated. This necessitates a considerable amount of complicated piping. Furthermore, only about 83 percent of the total catalyst charge to the six reactors is used continuously. In contrast, in the method of the present invention 93 percent of the total catalyst charge is in continuous use. In addition to the considerable amount of complicated piping required to maintain the swing reactor in the proper sequential position, the valving necessary to maintain the swing reactor in the proper place in the reactor train is very complicated. In contrast with the swing reactor system which requires the switching of large valves so that the swing reactor may be used in any position in the progression through five reactors, the method of the present invention requires no switching of the process streams in and out of each reactor stage, and the large (20-inch diameter) process piping is permanently connected to each reactor stage without the use of valves.

Accordingly, it is an object of the present invention to provide a method of reforming naphtha at pressures of about 300 p.s.i.g. or less wherein deactivation of the platinum-metal group reforming catalyst due to the deposition of coke requires frequent regeneration of the catalyst and the on-stream period for any single reaction stage is considerably less than one month, e.g., 12 to 240 hours, employing a plurality of reaction stages, each reaction stage having a plurality of reaction zones, at least one of said reaction zones being regenerated whilst the other reaction zones in each reaction stage are on-stream. It is another object of the present invention to provide a method of reforming naphtha at pressures of about 300 p.s.i.g. or less employing a plurality of reaction stages each having a plurality of reaction zones all of which reaction zones in each reaction stage are in fluid communication with a charge manifold and an effluent manifold and selectively isolating one reaction zone in at least one reaction stage from the aforesaid charge manifold and effluent manifold whilst maintaining fluid communication between said charge manifold and said effluent manifold and the other reaction zones in each reaction stage. It is a further object of the present invention to provide a presently preferred apparatus for reforming naphtha in accordance with the present method. Other objects and advantages will become apparent to those skilled in this art from the following discussion taken in conjunction with the drawings in which FIGURE 1 is a flowsheet showing in a diagrammatic manner the flow of reactant gases and vapors through a plurality of reaction stages having a plurality of reaction zones and the flow of circulating regenerating gas through the reaction zones off-stream and in the regeneration portion of the cycle;

FIGURE 2 is a vertical section taken at line 2—2 in FIGURE 3a;

FIGURES 3a and 3b are a vertical longitudinal section of a presently preferred reactor having a plurality of reaction stages each having a plurality of reaction zones, all of the reaction zones in each reaction stage being in fluid communication with an upper plenum chamber serving as a vapor inlet manifold and all of the reaction zones in each reaction stage being in fluid communication with a lower plenum chamber serving as a vapor outlet manifold;

FIGURE 4 is a vertical section of a rising stem valve mechanism presently preferred as a closure means between each reaction zone and its plenum chambers;

FIGURE 5 is detail sectional view of the valve seat and plug presently preferred as a closure means between each reaction zone and its plenum chambers;

FIGURE 6 is a detail cross-section of a removable plug valve seat as an alternate closure means between each reaction zone and its plenum chambers; and FIGURE 7 is a flowsheet illustrating the flow of vapors through the reaction zones on-stream and the flow of regenerating gases through the reaction zones under regeneration in a reactor of the presently preferred type having three reaction stages.

Figure 1:
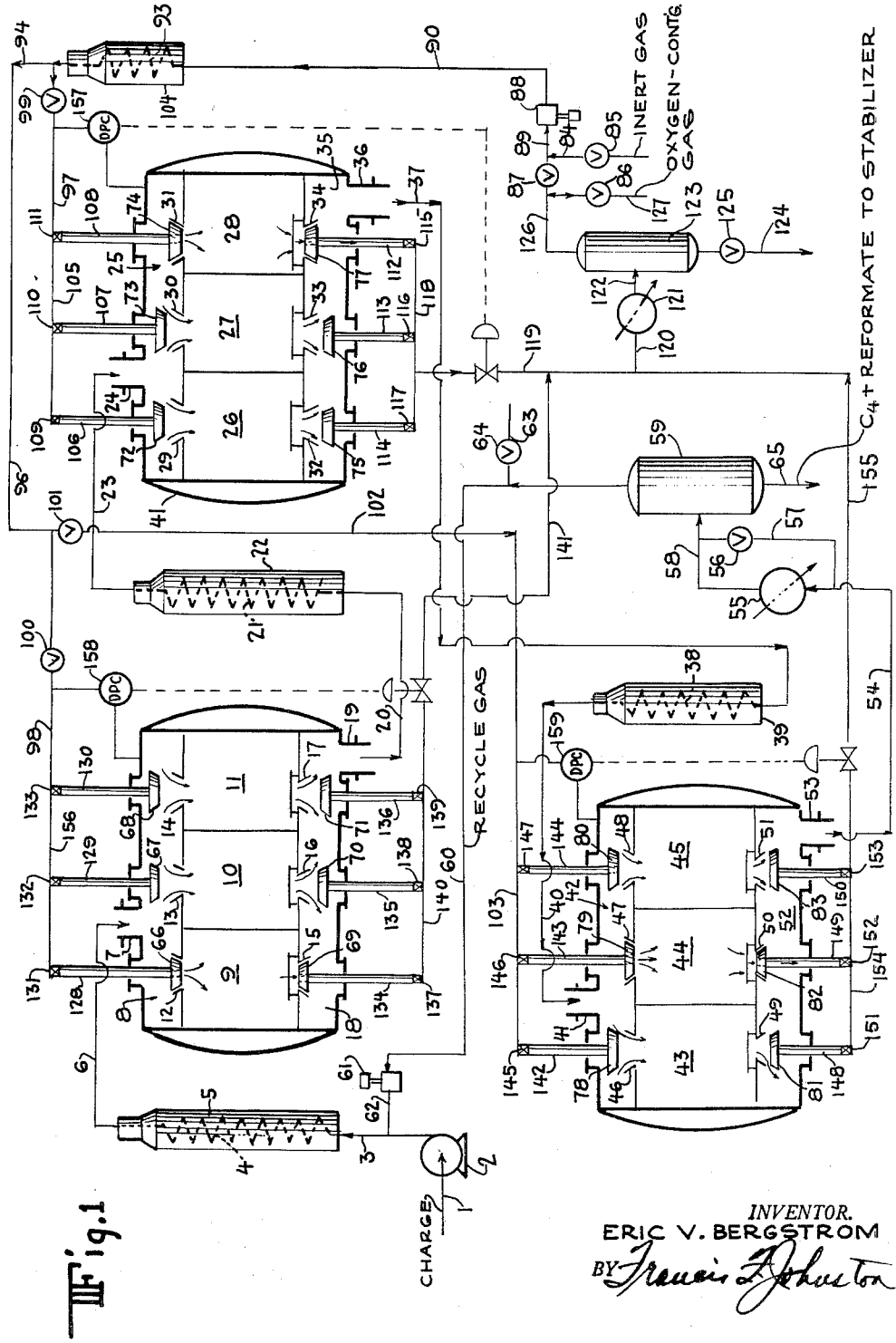

Broadly stated, the present invention provides a method for reforming hydrocarbons at pressures not greater than about 500 p.s.i.g. and preferably at pressures not greater than about 300 p.s.i.g. in the presence of hydrogen and of static beds of particle-form, solid, platinum-group metal reforming catalyst. The present method provides for reforming hydrocarbon in a plurality of reaction stages with reheating of the vapors between reaction stages. The present method also provides for a plurality of reaction zones in each reaction stage. Characteristic of the method of the present invention is the regeneration of the catalyst in at least one reaction zone in at least one reaction stage while hydrocarbon is being reformed in the other reaction zones of each reaction stage.

The present invention also provides a novel reactor for reforming hydrocarbon in a plurality of reaction stages each having a plurality of reaction zones in which the method of the present invention can be practiced.

The flowsheet FIGURE 1 is illustrative of one means for reforming naphtha in the presence of particle-form solid reforming catalyst, preferably a platinum-group catalyst, in a plurality of reaction stages in which each reaction stage has a plurality of reaction zones. At least one reaction zone is being regenerated while the other reaction zones in each reaction stage are on-stream for reforming the naphtha feed. It will be observed that the piping, furnaces and gas compressor for heating and circulating the regenerating gas are separate from the piping, heaters, and gas compressor for heating and circulating the reaction gases.

Illustrative of the method of the present invention is the flow of vapors and gases through a plurality of reaction stages in which each reaction stage is divided into a plurality of reaction zones shown diagrammatically in FIGURE 1. Those skilled in the art will understand that, while only three reaction stages with three reaction zones in each reaction stage are illustrated, there can be more or less reaction stages each having more or less reaction zones. The number of reaction stages will be dependent upon the total amount of catalyst required to provide the predetermined liquid hourly space velocity (volume of feed per hour per volume of catalyst) and the volume of catalyst contacted by the feed in producing a temperature drop sufficient to require reheating to the required reaction temperature to produce a $C_5+$ reformate of predetermined octane rating.

In general, each reaction zone is maintained at a reaction pressure not greater than about 500 p.s.i.g. although the reaction vessels can be designed for reaction pressures of 1000 to 1200 p.s.i.g. Reaction temperatures of about 800° to about 1000° F. are employed with liquid hourly space velocities (v./hr./v.) of 0.2 to 10. Hydrogen-to-naphtha mol ratios of about 1/1 to about 10/1 are employed.

Naphtha to be reformed in accordance with the present method contains as little irreversible catalyst poisons such as arsenic as is practically possible. For example, the feed naphtha should be "essentially free of arsenic" this characterization designates a concentration of arsenic which, when the reformer feed is contacted with a bed of reforming catalyst containing about 0.35 percent platinum by weight, is insufficient to deactivate said catalyst within the life of the catalyst, for example two years, as determined by other factors such as the temperature required to produce a reformate having an octane rating of at least 100 ($R+3$ cc.), the yield of reformate, and the mechanical strength of the catalyst. The feed naphtha should not contain more than 1 p.p.m. of nitrogen when employing a platinum-group metal reforming catalyst such as a particle-form solid platinum-group metal reforming catalyst comprising about 0.1 to about 1.0, preferably about 0.2 to about 0.4 percent by weight platinum and about 0.1 to about 0.8 percent by weight of a halogen on a refractory metal oxide support such as alumina, silica, or silica-alumina. The concentration of sulfur in the naphtha feed which can be tolerated is to a very great extent solely dependent upon the corrosion resistance of the metal from which the piping and reactors are fabricated. For units in which the metal of the piping and reactors is not a highly alloyed, highly corrosion-resistant steel the upper limit of sulfur concentration is about 20 p.p.m.

A naphtha or a mixture of naphthas, i.e., straight run naphtha, or cracked naphtha, or a mixture of straight run naphtha and cracked naphtha containing about 1 p.p.m. of nitrogen and essentially free of arsenic is drawn from a source not shown through pipe 1 by pump 2. Pump 2 discharges the naphtha into conduit 3. As used herein "essentially free of arsenic" designates a concentration of arsenic in a reformer feed which, when said reformer feed is contacted with a bed of reforming catalyst comprising 0.35 percent platinum by weight, is insufficient to deactivate said catalyst within the life of the catalyst, for example two years, as determined by other factors such as the temperature required to produce a reformate having an octane rating of at least 100 ($R+3$ cc.), the yield of reformate, and the mechanical strength of the catalyst. At some point in conduit 3 intermediate to the discharge of pump 2 and to heater 5 hydrogen-containing gas, for example, recycle gas from conduit 62 is mixed with the feed naphtha in the mol proportion within the limits set forth hereinbefore to provide a charge mixture. The charge mixture flows through conduit 3 at a pressure greater than that in the first reaction stage to coil 4 in heater 5.

In heater 5 the charge mixture is heated to a reforming temperature within the range of about 800° to about 1000° F. dependent upon the activity of the catalyst and the target octane rating of the $C_5+$ reformate to be produced. From heater 5 the heated charge mixture flows through conduit 6 to first reaction stage vapor inlet 7. From vapor inlet 7 the charge mixture flows into inlet plenum chamber 8. Reaction zones 9, 10 and 11 are in fluid communication with inlet plenum chamber 8 through reaction zone inlets 12, 13 and 14. In the drawing reaction zone 9 is undergoing regeneration while reaction zones 10 and 11 are on-stream. Accordingly, the charge mixture flows from inlet plenum chamber 8 into reaction zones 10 and 11 through reaction zone inlets 13 and 14 respectively.

Reaction zones 9, 10 and 11 are filled with a particle-form, solid, reforming catalyst. Presently preferred is a platinum-group metal reforming catalyst, a particularly a platinum metal reforming catalyst comprising about 0.35 to about 0.60 percent by weight platinum and about 0.35 to about 0.60 percent by weight chlorine on an alumina support.

The charge mixture flows downwardly in contact with the reforming catalyst in reaction zones 10 and 11 through reaction zone outlets 16 and 17 respectively to outlet plenum chamber 18. From outlet plenum chamber 18 the reaction zone effluents flow as a single vaporous stream to reaction stage vapor outlet 19. From reaction stage vapor outlet 19 the first reaction stage effluent flows through conduit 20 to coil 21 in heater 22.

In heater 22 the first reaction stage effluent is reheated to a reforming temperature the same as, or higher, or lower than the reforming temperature to which the charge mixture is heated in furnace 5. From heater 22 the reheated first reaction stage effluent flows through conduit 23 to second reaction stage vapor inlet 24.

From second reaction stage vapor inlet 24 the reheated first reaction stage effluent or first effluent flows into second reaction stage inlet plenum chamber 25. It will be observed that as illustrated reaction zones 26 and 27 are on-stream while reaction zone 28 is being regenerated.

The reheated first effluent flows from second reaction stage inlet plenum chamber 25 to reaction zones 26 and 27 through reaction zone inlets 29 and 30 respectively. The reheated first effluent flows downwardly through reaction zones 26 and 27 in contact with the particle-form solid reforming catalyst therein to reaction zone outlets 32 and 33 respectively to outlet plenum chamber 35. In outlet plenum chamber 35 the reaction zone effluents mix to provide a reaction stage effluent, designated second effluent, which flows from outlet plenum chamber 35 through reaction stage outlet 36 to conduit 37. The second effluent flows through conduit 37 to coil 38 in furnace 39.

In furnace 39 the second effluent is reheated to a reforming temperature the same as, or lower, or higher than the temperature to which the charge mixture is heated in furnace 5 and the first effluent is heated in heater 22. From heater 39 the reheated second effluent flows through conduit 40 to the vapor inlet 41 of the third reaction stage.

From vapor inlet 41 of the third reaction stage the reheated second effluent flows into third reaction stage inlet plenum chamber 42 of the third reaction stage. It will be observed that reaction zones 43 and 45 are on-stream and that reaction zone 44 is being regenerated. From inlet plenum chamber 42 the reheated second effluent flows through reaction zone inlets 46 and 48 to reaction zones 43 and 45 respectively.

The reheated second effluent flows downwardly through reaction zones 43 and 45 in contact with the particle-form solid reforming catalyst therein. From reaction zones 43 and 45 the reaction zone effluents flow through reaction zone outlets 49 and 51 to outlet plenum chamber 52 where the reaction zone effluents mix to form the third reaction stage effluent. The third reaction stage effluent flows through third reaction stage vapor outlet 53 to conduit 54.

The third reaction stage effluent, now designated third effluent, flows through conduit 54 to cooler 55. In cooler 55 the temperature of the third effluent is lowered to that at which $C_4$ and heavier hydrocarbons are condensed. When necessary to maintain a temperature at which $C_4$ and heavier hydrocarbons are condensed a part or all of the third effluent can by-pass cooler 55 by opening valve 56 in conduit 57 through which the by-passed portion of the third effluent flows to conduit 58 and thence to separator 59. All or that portion of the third effluent flowing through cooler 55 flows through conduit 58 to liquid-gas separator 59.

In liquid-gas separator 59 the condensed portion of the third effluent is separated from the uncondensed portion of the third effluent. The uncondensed portion of the third effluent comprising $C_1$ to $C_4$ hydrocarbons and hydrogen, now designated recycle gas, flows from separator 59 through conduit 60 to the suction side of compressor 61. Compressor 61 recompresses the recycle gas to a pressure about equal to that in conduit 3 which, as has been stated hereinbefore, is greater than the pressure in the first reaction stage. The repressured recycle gas flows from compressor 61 through conduit 62 to conduit 3 where the recycle gas is mixed with the charge naphtha as described hereinbefore. A portion of the recycle gas about equal to the amount of gas made during the reaction is vented through conduit 63 under control of valve 64 to other processes in which a hydrogen-containing gas of the composition of recycle gas can be used.

The condensed portion of the third effluent comprising $C_5$ and heavier hydrocarbons with some $C_4$ hydrocarbons, now designated reformate, flows from separator 59 through pipe 65 to a stabilizer not shown and the addition of additives, stored and/or distribution.

As illustrated, one reaction zone in each reaction stage is under regenerating conditions while the other reaction zones in each reaction stage are on-stream, i.e., under reforming conditions. Consequently, separate regeneration piping, compressors, and the like are required for regeneration. While one or more of the feed heaters can be piped for heating the circulating regeneration gases better flexibility is provided with an auxiliary furnace for heating the circulating regenerating gases.

Regeneration of the catalyst in the reaction zones not on-stream is achieved in the manner described hereinafter. It will be observed by those skilled in the art that preferably each reaction zone is provided with an inlet valve and an outlet valve having a tubular stem through which the regeneration gases enter and leave the reaction zone undergoing regeneration. Each of the foregoing tubular valve stems is provided with a valve by means of which the flow of regenerating gases into or out of the respective reaction zone is controlled. Valves of any suitable construction to achieve these ends can be used. However, it is presently preferred to use valves having the structure illustrated. The valves illustrated are of the furnace header plug type closure means of which there are hundreds of thousands in use. The plug is heavy and stiff while the tapered seat is machined into a thin wall cylinder. At the temperatures to which these valves are subjected, the seat is readily rounded to the shape of the plug by a closing force which can be as little as a stem force of 700 pounds.

Regeneration of the catalyst in the reaction zone or zones not on-stream is carried out as follows. As illustrated, the catalyst in one reaction zone in each reaction stage is being regenerated. That is to say, inlet valve 66 and outlet valve 69 in the vapor inlet 12 and the vapor outlet 15 respectively of reaction zone 9 in the first reaction stage are shown in the closed position isolating reaction zone 9 from inlet plenum chamber or manifold 8 and outlet chamber or manifold 18. Similarly, inlet valve 74 in vapor inlet 31 and outlet valve 77 in vapor outlet 34 in reaction zone 28 in the second reaction stage are shown in the closed position. It will also be observed that inlet valve 79 and outlet valve 82 in reaction zone 44 in the third reaction stage are shown in the closed position. The three reaction zones (9, 28 and 44) are ready for the initiation of the regeneration operation. (It will be observed that each pair of valves 66 and 69 in reaction zone 9; of valves 74 and 77 in reaction zone 28; and of valves 79 and 82 in reaction zone 44 serve to isolate the associated reaction zone from the associated inlet manifold and outlet manifold.)

Inert gas, e.g., nitrogen, flue gas containing less than 50, and preferably not more than 1, percent carbon monoxide, and the like drawn from a source not shown through conduits 84 and 89 (valve 85 open, valves 86 and 87 closed) by compressor or pump 88 is pumped through conduit 90 and coil 93 in heater 104 to purge the reaction zones the catalyst in which is to be regenerated. The use of hot purge gas is preferred to avoid cooling the catalyst bed to be regenerated. The purge gas flows from coil 93 into manifold 94. From manifold 94 a portion of the purge gas flows through conduit 96 in part to conduit 102 and in part to conduit 98 (valves 100 and 101 being open). The balance of the purge gas flows through conduit 97 (valve 99 open).

The purge gas flows from conduit 97 to reaction zone purge inlet manifold 105 having branches 106, 107 and 108 with valves 109, 110 and 111 respectively. The purge gas flows through purge manifold 105 to branch 108 (valves 109 and 110 closed; valve 111 open) and thence, preferably through the hollow stem (as described hereinafter) of plug valve 74, to reaction zone 28. The purge gas flows downwardly through reaction zone 28 to plug valve 77 and thence, preferably through the hollow stem of valve 77, to purge outlet manifold branch 112 having valve 115. (Valve 116 in purge outlet manifold branch 113 and valve 117 in purge outlet manifold branch 114 being closed.) From purge outlet manifold branch 112 the purge gas flows to purge outlet manifold 118. From purge outlet manifold 118 the purge gas flows to conduit 119 and thence through conduit 120 to cooler 121. In cooler 121 the gas is cooled to about 80° to 100° F. to condense any water therein. From cooler 121 the purge gas flows through conduit 122 to liquid-gas separator 123. In liquid-gas separator 123 the condensed water separates and is withdrawn in any suitable manner through pipe 124 under control of valve 125. The uncondensed purge gas is vented from separator 123 through conduits 126 and 127, valve 87 closed and valve 86 opened.

Alternatively, the purge gas flows from conduit 97 to manifold 118 and branch 112, and thence through the hollow stem of plug valve 77 to reaction zone 28. From valve 77 the purge gas flows upwardly through reaction zone 28 to plug valve 74, through the hollow stem thereof to manifold branch 108, manifold 105 and suitable alternative piping to cooler 121 and liquid-gas separator 123.

In a similar manner the balance of the purge gas flows through manifold branch or conduit 96 to conduits 98 and 102. From conduit 98 the purge gas flows through purge inlet manifold 156 having branches 128, 129 and 130, flow to which is controlled by valves 131, 132 and 133 respectively. Similarly, the purge gas flows through conduit 102 to purge inlet manifold 103 having branches 142, 143 and 144, flow to which is controlled by valves 145, 146 and 147 respectively.

Returning to the description of the flow of purge gas through conduit 98 and purge inlet manifold 156, since reaction zone 9 is to be purged and the catalyst therein regenerated valves 132 and 133 are closed and valve 131 in purge inlet manifold branch 128 is open. The purge gas flows through manifold branch 128 and preferably the hollow stem of valve 66 to reaction zone 9. The purge gas flows downwardly through reaction zone 9 to valve 69, preferably through the hollow stem thereof, to purge outlet manifold branch 134 having open valve 137 to purge outlet manifold 140. (It will be observed that purge outlet manifold 140 is provided with manifold branches 135 and 136 having closed valves 138 and 139 preferably connected with the hollow stems of plug valves 70 and 71 respectively.) From purge outlet manifold 140 the purge gas flows through conduit 141 to conduits 119 and 120, cooler 121, conduit 122 and separator 123. In separator 123 the uncondensed purge gas is vented through conduits 126 and 127 and the condensate drawn off in any suitable manner as previously described with reference to the purging of reaction zone 28.

The purge gas flows from conduit 102 to purge inlet manifold 103 having branches 142, 143 and 144. Flow of purge gas to these branches is controlled by valves 145, 146 and 147 respectively. Since the catalyst in reaction zone 44 is to be regenerated valves 145 and 147 are closed and valve 146 open. The purge gas flows from purge manifold 103 to branch 143 and then, preferably, through the hollow stem of plug valve 79 to reaction zone 44. The purge gas flows downwardly through reaction zone 44, preferably to the hollow stem of plug valve 82 and thence to purge outlet manifold branch 149. With valve 152 open the purge gas flows from branch 149 to purge outlet manifold 154. (It will be observed that reaction zones 43 and 45 are connected preferably through the hollow stems of plug valves 81 and 83 respectively to purge outlet manifold branches 148 and 150. Flow through these purge outlet manifold branches is controlled respectively by valves 151 and 153.) From purge outlet manifold 154 the purge gas flows through conduits 155 and 120 to cooler 121, conduit 122 and separator 123. The uncondensed gas is vented from separator 123 through conduits 126 and 127. Condensate is drained in a suitable manner through pipe 124 under control of valve 125.

It will be observed that each reaction stage is provided with a differential pressure controller 157, 158 and 159 respectively. Differential pressure controller 157 is of the conventional type and is in fluid connection with vapor inlet manifold 25 and purge outlet manifold 118. Differential pressure controller 158 of any suitable type is in fluid connection with vapor inlet manifold 8 and purge outlet manifold 140. Differential pressure controller 159 similar to controllers 157 and 158 is in fluid connection with vapor inlet manifold 42 and purge outlet manifold 154.

As is well-known to those skilled in the art differential pressure controllers are means which, since a predetermined difference in pressure is to be maintained between two zones, control the pressure of vapors entering one zone to maintain a predetermined pressure differential between that zone and the other. Thus, differential pressure controllers 157, 158 and 159 operate to maintain a greater pressure in the reaction zone undergoing regeneration than in the vapor inlet manifold of the reaction stage of which the aforesaid reaction zone is a part. Preferably, the pressure differential is of the order of about 5 p.s.i. to about 25 p.s.i. That is to say, for example, the pressure in reaction zone 28 is maintained about 5 p.s.i. to about 25 p.s.i. higher than the pressure in vapor inlet manifold 25. Thus, the pressure in purge manifold 118 is about 205 p.s.i. and the pressure in vapor inlet manifold 25 is about 200 p.s.i.

By maintaining the pressure in the reaction zone undergoing regeneration about 5 p.s.i. to about 25 p.s.i. above the pressure in the associated vapor inlet manifold any leakage of gas is from the reaction zone into the vapor inlet manifold. From this it follows that the concentration of oxygen in the mixture of hydrocarbon vapors and hydrogen will be below the flash or explosion concentration at the existing temperatures and pressures.

Purge gas is pumped through each reaction zone the catalyst in which is to be regenerated until a volume of purge gas has passed through the aforesaid reaction zone which is at least equal to twice the volume of the empty reaction zone. When that volume of inert purge gas, e.g., flue gas, nitrogen or the like, has passed through each reaction zone the catalyst in which is to be regenerated, the passage of inert gas containing oxygen through the purged reaction zone(s) is started.

Accordingly, after purging as described hereinbefore, valve 87 is opened and valves 85 and 86 are closed and the inert gas circulated through the reaction zones the catalyst in which is to be regenerated and the heater 104 until the temperature in each zone under regeneration is about 725° to about 750° F. When the aforesaid temperature is reached in each of reaction zones 9, 28 and 44 oxygen or oxygen-containing gas, e.g., air, is introduced through conduit 127 under control of valve 86 into the circulating stream of heated inert gas. The oxygen concentration of the circulating gases is increased to not above 1 percent while the peak temperature in the catalyst bed in each of reaction zones 9, 28 and 44 due to combustion of the carbonaceous deposit on the catalyst is maintained below about 875° F. The gas from the reaction zones 9, 28 and 44 flows to conduit 120 and cooler 121 where the circulating gas is cooled to below about 80° F. at 100 p.s.i.g. to maintain the dew point of the circulating gas not greater than 80° F. at 100 p.s.i.g. When oxygen is detected in the regeneration gases flowing from any reaction zone the regeneration of the catalyst in that zone is completed. The reaction zones in which the regeneration is completed are then ready for purging and putting on-stream. The reaction zones after regeneration of the catalyst are purged as before. That is to say, valve 87 is closed, valve 85 is opened and inert gas drawn from a source not shown through conduit 84 is circulated around heater 104 through the reaction zones in which regeneration of the catalyst has been completed to separator 123 and the uncondensed gas vented through conduits 126 and 127 until an amount of inert purge gas at least equal to about twice the volume of the reaction zone(s) in which regeneration has been completed has passed through the zone(s). Valves 111, 115, 131, 137, 146 and 152 are then closed and valves 66, 69, 74, 77, 79 and 82 are opened to place reaction zones 9, 28 and 44 on-stream again. Thereafter, one or more of the other reaction zones 10, 11, 26, 27, 43 and 45, but usually not more than one reaction zone in each reaction stage, is prepared for regeneration. It will be observed that while the catalyst in one or more reaction zones is being regenerated the other reaction zones are on-stream.

While the present invention has been described hereinbefore in conjunction with the use of a plurality of reactors each providing one reaction stage and a plurality of reaction zones in each reaction stage, it is preferred to employ a single reactor having a plurality of reaction stages, say five, and each reaction stage having a plurality of reaction zones, say three, as illustrated in FIGURES 2, 3a, 3b, 4, 5, 6 and 7.

In the preferred method of reforming in accordance with the principles of the present invention a single reactor having a plurality of reaction stages is employed. Each reaction stage has a plurality of reaction zones in selected fluid communication with a charge manifold or vapor inlet manifold common to all of the reaction zones in that stage and in selected fluid communication with an effluent manifold or vapor outlet manifold common to all of the reaction zones in that reaction stage. The reactor is valved to provide for regenerating at least one reaction zone whilst the other reaction zones in all reaction stages are on-stream.

In contrast to the embodiment illustrated in FIGURE 1 the catalyst in only one of the fifteen reaction zones illustrated is shown undergoing regeneration. This illustrates the great flexibility of the method and apparatus of the present invention. That is to say, the catalyst in only one of the reacton zones of all of the reaction zones in all of the reaction stages can be undergoing regeneration or the catalyst in one reaction zone in each reaction stage can be undergoing regeneration or the catalyst in one reaction zone in more than one but less than all reaction stages can be undergoing regeneration whilst the other reaction zones are on-stream. The order in which the catalyst in the reaction zones is regenerated is not fixed but dependent upon the condition of the catalyst. However, usually for practical reasons of operating simplicity a sequence, varying with local management, is establshied and followed. As shown in FIGURES 3a and 3b the catalyst in reaction zone 1c only is undergoing regeneration. However, it is to be understood that under other local conditions the catalyst in reaction zone 3a could be undergoing regeneration. Thus, for example, dependent upon local conditions it can be found that regeneration of the catalyst in reaction zone 5c will be required first.

In the presently preferred form the multi-reaction stage, multi-reaction zone reactor comprises a horizontal cylindrical tank having a shell 150 supported in any suitable manner (FIGURES 2 and 3a and 3b). The reactor is provided with a plurality of vapor inlets 151 each one of which is in fluid communication with the charge manifold or vapor inlet manifold of only one reaction stage. The reactor is also provided with a plurality of vapor outlets 152 each one of which is in fluid communication with the effluent manifold or vapor outlet manifold of only one reaction stage. The reactor is provided with a liner 153 spaced from shell 150 to protect the shell during regeneration and to provide more uniform shell temperature and process operation by circulation of the outlet vapors between the shell and the liner. To prevent commingling of the reaction products circulating between liner 153 and shell 150 with reactant vapors, it is presently preferred to mount a baffle 153a horizontally in a vapor-tight manner between shell 150 and liner 153 (FIGURE 2), between shell 150 and plate 178 (FIGURE 3a), and between shell 150 and plate 179 (FIGURE 3b). (In FIGURE 7 the baffle 256a is the equivalent of baffle 153a in FIGURES 3a and 3b.) Liner 135 is rigidly mounted on conduits 154 (FIGURE 2) through which the hollow stems of the plug valve closure means of each reaction zone extend as is described hereinafter. As shown more in detail in FIGURE 2, along the longitudinal median line of the bottom of liner 153 at a point in each reaction zone a vapor outlet 155 serving as a valve seat is mounted on the shell side of the periphery of liner 153. A plenum chamber is formed between the lower section of the shell and the bottom of the liner. A similar plenum chamber is formed between the upper section of liner 153 and a plurality of arcuate horizontal partitions 156.

Concentric with each vapor outlet 155 is a conduit 157 mounted in shell 150 and making a fluid-tight joint therewith as by welding. To strengthen the shell arcuate reinforcing members 158 and 159 are mounted as by welding to the outer periphery of the shell in the region of conduits 154 and 157 and vapor inlets 151 and vapor outlets 152.

Between each conduit 154 and arcuate horizontal partition 156 a plurality of spacing rods 160 is rigidly mounted (FIGURE 2). Preferably the spacing rods are spaced 90 degrees apart and concentric with the vertical axis of the conduit 154. A plurality of spacing rods 172 preferably spaced apart 90 degrees is rigidly mounted between the bottom of liner 153 and conduits 157. Preferably the spacing rods are concentric with the vertical axis of conduit 157.

Conduits 154 and 157 are flanged and provided with plates 161 and 162 respectively. Plates 161 and 162 are removably mounted in a fluid-tight manner by a plurality of bolts and associated nuts 163 and 164 respectively.

Concentric with the vertical axis of each of conduits 154 a thin walled cylinder 165 is mounted in a fluid-tight manner on arcuate horizontal partition 156. Cylinder 165 serves as a vapor inlet to the associated reaction zone as well as a valve seat for plug 166.

Each of plates 161 is provided with a plug bored to provide a sliding fit with hollow stem 167 on which plug 166 is mounted. Mounted in a fluid-tight manner on each of plates 161 concentric with the vertical axis of the hollow stem 167 of the plug valve is a sleeve 168 within which the stem of the plug valve is free to be raised or lowered in response to the action of the conventional hand wheel 190 (FIGURE 4).

Similarly, each of plates 162 is bored to provide a sliding fit with hollow stem 169 on which plug 170 is mounted. Mounted in a fluid-tight manner on each of plates 162 concentric with the vertical axis of the hollow stem 169 of the plug valve is a sleeve 171 within which the stem of the plug valve is free to be raised or lowered in response to the revolution of the conventional hand wheel.

A plurality of plate supports, columns, pillars, 173 are rigidly mounted on the bottom of liner 153 in each reaction zone. A foraminous catalyst bed support, preferably a perforated plate 174 having a periphery complementing the periphery of a reaction zone is rigidly mounted on the aforesaid plate supports in each reaction zone. A wire mesh 175 having openings small enough to preclude passage of substantially all of the particles of particulate solid of the reaction zone is mounted on the upper surface of plate 174.

The cylinder formed between arcuate horizontal partition 156 and reactor liner 153 is sealed at the ends thereof by plate 178 and 179 (FIGURES 3a and 3b). The space within the cylinder formed by partition 156 and liner 153 is divided into a plurality of reaction stages (five are illustrated) by vertical arcuate plates 180. Each of plates 180 is rigidly mounted in a fluid-tight manner on the inner periphery of reactor shell 150 in any suitable manner as by welding. Fuild-tight joints are made in any suitable manner between plates 180 and the horizontal arcuate partition 156 and liner 153. Each reaction stage is divided into a plurality of reaction zones (three are illustrated) by vertical arcuate plates 181. Vertical arcuate plates 181 are rigidly mounted in a fluid-tight manner between horizontal arcuate partition 156 and liner 153 as by welding to the liner 153 and to the horizontal arcuate partition 156.

Reference is made to FIGURES 4, 5 and 6 for the details of the reaction zone vapor inlet valves and the reaction zone outlet valves. While any mechanism whereby a reaction zone can be selectively isolated from both the vapor inlet manifold and the vapor outlet manifold can be employed and while any means for introducing and removing regenerating gases from the isolated reaction zones can be employed it is preferred to employ the mechanism illustrated. The rising stem plug valves illustrated serve not only to isolate the respective reaction zones from the vapor inlet manifolds but also serve as means for introducing and withdrawing the regenerating gases from the isolated reaction zones.

The rising stem valve illustrated is a modification of the conventional rising stem valve having a conventional lantern-type stuffing box. That is to say, the stem of a conventional valve is replaced with a pipe, say 1.5 inches in diameter, which serves to introduce regenerating gases into the isolated reaction zone served by the valve at the top of the reaction zone and to withdraw regenerating gases from the isolated reaction zone through the valve at the bottom of the isolated reaction zone.

The valve consists of cylinder 165 machined to a thickness that when the plug 166 is forced into the cylinder 165 the cylinder readily is deformed at the environmental temperatures to conform with the periphery of plug 166, preferably both the plug 166 and the cylinder 165 are tapered. The pipe 167 which replaces the stem of the conventional rising stem valves runs vertically through the packing gland 186 and turns in a convenient angle 187 at the point where the stem in a normal rising stem valve is threaded. The angle at which the rigidly mounted piping through which the regenerating gases are brought to or withdrawn from the valve is that most convenient depending upon local conditions. Concentric with the stem pipe 167 there is welded to the top of the L a threaded stub 188 to pass through the yoke 189 to provide for vertical movement of the pipe 167 and its attached valve plug 166 in response to the revolution of hand wheel 190. To provide for movement of pipe 167 vertically, spacer blocks 191 are inserted between yoke 189 and flange 192 of pipe 193. In the region of the lower end of pipe 193 an annular plate 194 having an internal diameter substantially that of stem pipe 167 to provide a sliding fit therewith is mounted on the internal periphery of pipe 193 to provide a rigid surface against which the packing 202 of packing gland 186 can bear. Packing follower 195 is movably mounted in any suitable manner to subject the packing 202 to compression.

FIGURE 5 is a cross-section of plug 166, valve seat and reaction zone vapor inlet 165, which are similar in structure to plug 170 and valve seat and reaction zone vapor outlet 155, showing the tapered form of the plugs and the valve seats.

FIGURE 6 is a cross-section of an alternate method of mounting the valve seats 155 and 165. An annulus 196 is rigidly mounted as by welding on horizontal arcuate partition 156 to provide a vapor inlet for each reaction zone. A similar annulus is mounted on the shell side of the bottom section of liner 153 to provide a reaction zone vapor outlet. On the shell side of annulus 196 a plurality of bolts 197 is rigidly mounted. A thin-walled cylinder 198 machined to receive the tapered plug 166 of the valve and having flange 199 rests on annulus 196. The inner diameter of cylinder 198 is substantially that of the inner diameter of annulus 196. Flange 199 has a width substantially equal to the distance between the outer periphery of cylinder 198 and bolts 197. The flange 199 is of suitable thickness to resist massive deformation from the pressure of spacers 200 when nuts 201 are turned down on bolts 197 to hold cylinder 198 rigidly in position.

The single reactor shown in FIGURES 3a and 3b like the reactors or reaction stages shown in FIGURE 1 is provided with a differential pressure controller 240 to maintain a substantially constant difference in pressure between the top of the zone or zones in which regeneration of the catalyst is taking place and the reaction stage vapor inlet plenum chamber or manifold. The pressure at the top of the reaction zone or zones in which the catalyst is being regenerated is maintained at 5 to 25, preferably 5 to 10, pounds per square inch above the pressure in the contiguous reaction stage vapor inlet plenum chamber or manifold. Thus, considering the first reaction stage numbering from the left in FIGURES 3a and 3b only for purposes of illustration, whilst charge mixture vapors enter the first reaction stage vapor inlet manifold through vapor inlet 151 and first reaction stage effluent flows from first reaction stage effluent manifold 202a through effluent outlet 152, inert gas such as flue gas flows through conduit 203 to conduit 204 having branches 205, 206, 207, etc. and by-pass 208. Each of branches 205, 206 and 207 is provided respectively with block valves 209 and 210, 212 and 213, and 215 and 216. These valves ensure that when the reaction zone with which the controlled branch is in fluid communication is on-stream there shall be no leakage of regenerating gas into, and no leakage of reactant vapors from the reaction zone. Drain valves 211, 214, and 217 provide for venting any gas which leaks past either of the associated block valves.

Each reaction zone is provided with a regenerating gas outlet conduit 218, 219 and 220. Each regenerating gas outlet conduit is provided with block valves respectively 221 and 222, 224 and 225, and 227 and 228 which ensure that there shall be no leakage from or to the associated reaction zone when the reaction zone is on-stream. Drain valves 223, 226 and 229 located on outlet conduits 218, 219 and 220 respectively provide for venting any gas that leaks past the closed block valves with which the drain valve is associated.

It will be observed that the differential pressure controller 240 of conventional design is connected with inert gas conduit 203, pressure sensing conduit 230 and control valve 231 located in regenerating gas outlet main 232. (Valves 233 and 234 are block valves manually operated as is by-pass valve 235 for use in emergency.)

Pressure sensing conduit 230 is provided with a branch 236 in fluid communication with each reaction stage vapor inlet manifold. Each branch 236 is provided with block valves 237 and 238 which ensure that when all reaction zones in any one reaction stage are on-stream there shall be no leakage from or to the associated reaction stage vapor inlet manifold. Valve 239 provides for venting any leakage past valves 237 and 238.

The differential pressure controller operates to maintain a pressure above the bed of catalyst in the zone under regeneration at least 5 but preferably not more than about 10 p.s.i. (pounds per square inch) greater than the pressure in the associated reaction stage vapor inlet manifold. Since there is a pressure drop between conduit 203 and the reaction zone under regeneration of about 20 to 25 p.s.i., it follows that the pressure in conduit 203 is about 25 to about 35 p.s.i. higher than the pressure in the reaction stage vapor inlet manifold.

As illustrated, reaction zone C in the first reaction stage is the only reaction zone in the regeneration portion of the cycle. Consequently, all of the inert gas conduit branch valves except valves 215 and 216 in branch 207 are closed. Valves 215 and 216 are open but drain valve 217 is closed. All of the valves in the regenerating outlet branches except valves 227 and 228 in branch 220 are closed. Valves 227 and 228 are open while drain valve 229 is closed. Valves 233 and 234 are open but valve 235 is closed.

By maintaining a pressure in the reaction zone in the regeneration portion of the cycle higher than the pressure in the associated reaction stage vapor inlet manifold at all times, the direction of flow of any leakage at the reaction zone vapor inlet valve must be in the direction of the reaction stage vapor inlet manifold. Since the relative volumes of gas flowing through a reaction zone under regeneration and the volume of gas flowing through the associated vapor inlet manifold are in the ratio of about 1 to 100, it is manifest that even where the regenerating gases contain 5 percent by volume of oxygen and 5 to 100 percent of the regenerating gases leak into the reaction stage vapor inlet manifold the mixture of reactant vapors and regenerating gas would contain only about 1/2000 percent oxygen, a concentration far below the minimum required for an explosive mixture.

To illustrate the method of reforming of the present invention employing a single reactor having a plurality of reaction stages, each of which has a plurality of reaction zones wherein the catalyst in at least one reaction zone but not more than one reaction zone in any reaction stage is being regenerated whilst the other reaction zones are on-stream the flow-sheet FIGURE 7 has been provided. The single, horizontal, substantially cylindrical, reactor 250 has elliptical ends 251 and 252. A liner 253 substantially the same as liner 153 in FIGURE 2 is rigidly mounted in reactor 250 spaced apart from the shell to provide for circulation of the reaction product gases and vapors between the shell and the liner. Horizontal arcuate partition 254 is the same as partition 156 in FIGURE 2. End plates 255 and 256 are mounted on liner 253 and partition 254 as in FIGURES 3a and 3b. The reactor is provided with a plurality of vapor inlets 257, 258 and 259 in fluid communication with vapor inlet manifolds 260, 261 and 262. The reactor is provided with a plurality of vapor outlets 263, 264 and 265 in fluid communication with vapor outlet manifolds 266, 267 and 268.

The space between horizontal arcuate partition 254, liner 253 and end plates 255 and 256 is divided into a plurality (three shown) of reaction stages by vertical partition 269. Each reaction stage is divided into a plurality of reaction zones by vertical partitions 270 to provide reaction zones Ia, Ib, Ic, IIa, IIb, IIc, IIIa, IIIb and IIIc. Each reaction zone is provided with a vapor inlet providing fluid communication between the vapor inlet manifold and the reaction zone. Each vapor inlet also serves as a seat for the plug. The vapor inlet and the plug forming reaction zone vapor inlet valves are designated 271, 272, 273, 274, 275, 276, 277, 278 and 279. Each reaction zone is provided with a similar vapor outlet and valve 280, 281, 282, 283, 284, 285, 286, 287 and 288 providing fluid communication between the reaction zones and the respective vapor outlet manifolds.

A vapor-solids separator 289 is mounted over each reaction zone vapor outlet as described in conjunction with FIGURE 2.

In charging each reaction zone with catalyst a bed of coarse particles, i.e., about three-fourths of an inch in diameter, of an inert solid such as alundum is placed on plate 174 (FIGURE 2). Two additional beds of successively finer particles of inert solid is placed upon first bed of inert solid. The catalyst particles are then placed upon the bed of inert solid particles. Preferably, one to three beds of successively finer particles of inert solid such as alundum are placed upon each bed of catalyst.

As shown in FIGURE 7 all of the reaction zones in all of the reaction stages except reaction zone Ia are on-stream. That is to say, as shown in FIGURE 7, only the catalyst in reaction zone Ia is being regenerated. (It is to be understood that the catalyst in any of the reaction zones other than Ia but not more than one reaction zone in any one reaction stage could be shown as undergoing regeneration.)

In describing the present method of reforming in conjunction with FIGURE 7, the flow of vapors and gases through the heaters and reaction zones which are on-stream first will be traced and then the flow of gases during the regeneration of the catalyst in a single reaction zone, zone Ia, will be traced.

Those skilled in the art will understand that for simplicity various heat exchangers have been omitted from the drawing FIGURE 7 and the following description.

A straight-run naphtha, a catalytically cracked naphtha, a thermally cracked naphtha, a mixture of two or more of the foregoing, or of one or more of the fractions of one or more of the foregoing naphthas containing not more than innocuous concentrations of catalyst poisons is the feed to the reactor illustrated in FIGURE 7. The naphtha preferably is reformed in the presence of a platinum-group metal reforming catalyst such as a catalyst comprising about 0.1 to about 2.0 percent by weight of platinum and about 0.1 to about 0.8 percent by weight of halogen, for example chlorine, on a support comprising a refractory oxide such as alumina under the following reaction conditions dependent upon the activity of the catalyst and the required octane rating of the $C_5$ and heavier reformate.

| | |
|---|---|
| Reaction presure, p.s.i.g | 15 to 500 |
| Reaction temperature, °F | 800 to 1000 |
| Liquid hourly space velocity, v./hr./v | 0.3 to 5 |
| Hydrogen-to-naphtha mol ratio | 3:1 to 10:1 |

Accordingly, naphtha feed containing not more than innocuous concentrations of catalyst poisons, e.g., not more than about 1 p.p.m. of nitrogen and essentially free of arsenic as defined hereinbefore is pumped by a pump not shown from a source not shown at a pressure greater than the pressure in reactor 250 through conduit 290. At some point in conduit 290 intermediate to the naphtha pump not shown and to heater 291 hydrogen-containing gas, such as recycle gas, drawn from a liquid-gas separator by a compressor and pumped by the aforesaid compressor through conduit 292 at a pressure substantially that in conduit 290, is mixed with the naphtha feed in a mol ratio within the range set forth hereinbefore to form a charge mixture.

The charge mixture flows through conduit 290 to coil 293 in heater 291. In naphtha furnace 291 the charge mixture is heated to a temperature within the limits set forth hereinbefore. The heated charge mixture flows from heater 291 through conduit 294 to vapor inlet 257 of vapor inlet manifold 260 serving the first reaction stage having reaction zones Ia, Ib and Ic. It will be observed that valve 271 is shown to be closed. Accordingly, the charge mixture flows from vapor inlet manifold 260 through valve 272 into reaction zone Ib and through valve 273 into reaction zone Ic.

In reaction zones Ib and Ic the charge mixture flows downwardly in contact with the particle-form solid reforming catalyst. The effluent of reaction zone Ib flows through effluent valve 281 into effluent manifold 266. The effluent of reaction zone Ic flows through valve 282 into effluent manifold 266 where the effluent of reaction zone Ic mixes with the effluent of reaction zone Ib to form the first effluent. The first effluent flows from effluent manifold 266 through effluent vapor outlet 263 to conduit 295. The first effluent flows through conduit 295 to coil 296 in heater or naphtha reheat furnace 297.

In naphtha reheat furnace 297 the first effluent is reheated to a temperature within the range set forth hereinbefore. The reheated first effluent flows through conduit 298 to second reaction stage vapor inlet 258 and through vapor inlet 258 to second stage vapor inlet manifold 261 serving reaction zones IIa, IIb and IIc. It will be observed that all of the reaction zones IIa, IIb and IIc are shown to be on-stream. Consequently, the reheated first effluent flows from second stage vapor inlet manifold 261 in part through valve 274 to reaction zone IIa, in part through valve 275 to reaction zone IIb, and in part through valve 276 to reaction zone IIc.

The reheated first effluent flows downwardly through reaction zones IIa, IIb and IIc in intimate contact with the catalyst therein to effluent valves 283, 284 and 285 respectively. The effluents from the three reaction zones mix in effluent manifold 267 to form the second effluent. The second effluent flows from effluent manifold 267 through effluent vapor outlet 264 to conduit 299. The second effluent flows through conduit 299 to coil 300 in reheat furnace 301.

In reheat furnace 301 the second effluent is reheated to a temperature within the range set forth hereinbefore. The reheated second effluent flows from furnace 301 through conduit 302 to vapor inlet 259. The reheated second effluent flows through vapor inlet 259 to third reaction stage vapor inlet manifold 262 serving reaction zones IIIa, IIIb and IIIc. From third reaction stage vapor inlet manifold 262 the reheated second effluent flows in part through valve 277 into reaction zone IIIa, in part through valve 278 into reaction zone IIIb, and in part through valve 279 into reaction zone IIIc.

The reheated second effluent flows downwardly in intimate contact with the reforming catalyst therein through reaction zones IIIa, IIIb and IIIc to effluent valves 286, 287 and 288 respectively. The effluents of these three reaction zones flow into and mix in effluent manifold 268 to form the third or final effluent. The final effluent flows from effluent manifold 268 through vapor outlet 265 and conduit 303 to a cooler 304 where the final effluent is cooled to a temperature at which $C_4$ and heavier hydrocarbons are condensed under the existing pressure. From cooler 304 the final effluent flows through conduit 305 to a liquid-gas separator 306 where the condensed $C_5$ and heavier hydrocarbons together with some $C_4$ hydrocarbons are separated from the uncondensed hydrogen and light hydrocarbons of the final effluent. The uncondensed hydrogen and light hydrocarbons, at least in part, is the recycle gas which is recompressed and pumped through conduit 292 to mix with fresh feed in conduit 290. Recycle gas in excess of that required in reactor 250 is diverted through conduit 308 to other processes utilizing hydrogen-containing gas of this composition. The condensed $C_4$ and heavier hydrocarbons designated reformate flow from the separator 306 through pipe 307 to stabilization, addition of additives such as TEL, anti-rust agents, anti-icing agents, etc., storage, blending, and/or distribution.

Those skilled in the art will understand that various heat exchangers, coolers, fractionators and the like have been omitted from the illustrative drawing and the description since they are not a part of this invention, to simplify the drawing, and are well-known to those skilled in the art.

While reaction zones Ib, Ic, IIa, IIb, IIc, IIIa, IIIb, and IIIc have been on-stream and described hereinbefore, the catalyst in reaction zone Ia is being regenerated. It is to be observed that the catalyst in any one reaction zone, but not more than one reaction zone in one reaction stage, can be undergoing regeneration.

Regeneration of the catalyst in reaction zone Ia is carried out as follows.

It will be observed that each reaction stage is in fluid communication with a regenerating gas main 310. Each reaction zone is in controlled fluid communication with the regenerating gas main 310 through the stem of the vapor inlet valve of a reaction zone in that reaction stage and a valved pipe. Thus, when the reaction zone inlet valve in any reaction zone is closed and that reaction zone isolated from its associated inlet manifold, the isolated reaction zone is in controlled, i.e., valved, communication with the regenerating gas main 310 through the closed reaction zone inlet valve, and one of the branches of the regenerating gas main designated 311, 312, 313, 314, 315, 316, 317, 318 and 319, each having two block valves for simplicity indicated by single valves 320, 321, 322, 323, 324, 325, 326, 327 and 328 respectively.

Each reaction zone is in controlled fluid communication with the waste gas main 329 when the reaction zone effluent valve is closed through the valve stem of the closed reaction zone effluent valve and a waste gas main branch. Thus, when the reaction zone effluent valve in any reaction zone is closed and that reaction zone isolated from its associated effluent manifold, the isolated reaction zone is in controlled, i.e., valved, communication with the waste gas main 329 through the closed reaction zone effluent valve, and one of the waste gas main branches designated 330 through 338 each having two block valves, for simplicity, indicated by single valves 339 through 347.

Any inert gas, such as flue gas, nitrogen, etc. can be used as a purge gas and as a carrier or diluent for the oxygen required for combustion of the carbonaceous deposit or coke on the catalyst. It is presently preferred to use flue gas as the purge gas and as the carrier or diluent of the oxygen-containing gas, usually air, although baffled oxygen can be substituted in part or entirely for air, required for the combustion of the coke.

Flue gas of controlled composition is readily produced in the manner illustrated in FIGURE 8. Fluid fuel, for example refinery gas, fuel oil, natural gas, etc., flows from a source not shown through conduit 348 to a burner(s) not shown in flue gas generator 350. Air for combustion of the fuel to provide a flue gas substantially devoid of free oxygen flows through conduit 349 to the burner(s) in flue gas generator 350. The fuel is burned in the generator and flows therefrom through stack 351. A major portion, about 65 percent of the flue gas produced is diverted from stack 351 through conduit 352 to scrubber 353. The flue gas enters scrubber 353 at a point in the region of the bottom thereof. Water flowing from a source not shown through pipe 354 enters the scrubber at a point in the region of the top thereof, flows downwardly therethrough and leaves the scrubber through pipe 355. The flue gas flows upwardly through the column of water which removes water-soluble contaminants such as oxides of sulfur from the flue gas. The scrubbed flue gas flows from scrubber 353 through conduits 356 and 361 to the suction side of compressor 362. At a point intermediate to scrubber 353 and compressor 362 oxygen-containing gas, usually air, flowing through conduit 357 having valve 358 is mixed with the scrubbed flue gas.

Valve 358 is opened or closed to maintain a predetermined concentration of oxygen in the flue gas as sensed by oxygen controller 359 through lead 360. The flue gas, substantially devoid of oxygen when used as a purge gas and having a controlled, predetermined concentration of oxygen when coke is being burned, flows through conduit 361 to the suction side of compressor 362. The compressed gas flows through conduit 363 to scrubber 364. The oxygen-containing flue gas flows upwardly in scrubber 364 through a descending column of water which water enters scrubber 364 through pipe 365 and leaves scrubber 364 through pipe 366.

The washed oxygen-containing flue gas flows from scrubber 364 through conduit 379 to conduit 367. Drying of the flue gas whether used as a purge gas or used as a diluent in conjunction with oxygen-containing gas is necessary. For this purpose it is preferred to dry the gas with a bed of particle-form solid desiccant such as alumina zeolites commonly designated molecular sieve material or the like. Since the static bed of desiccant must be regenerated to preclude interruption of the flow of dried flue gas, two beds of desiccant are provided. While one bed of desiccant is on-stream the other is being regenerated. Accordingly, assuming that the desiccant in drier 371 is being regenerated, then drier 372 is on-stream. That is to say, valve 369 in conduit 368 and valve 374 in conduit 373 are closed. Valve 371 in conduit 370 and valve 376 in conduit 375 are open. The flue gas with or without added oxygen flows from conduit 367 through conduit 370, drier 372, and conduit 375 to conduit 377. From the drier the flue gas flows through conduit 377 to coil 378 in flue gas generator 350. In coil 378 the dried flue gas is heated to about 700° to about 850° F. From coil 378 the heated flue gas flows through the regenerating gas main 310 to the branch of the regenerating gas manifold which is connected to the stem of the reaction zone inlet valve which is closed.

As shown in FIGURE 7, the catalyst in reaction zone I$a$ only is to be regenerated. Accordingly, while reactants flow from vapor inlet 294 to vapor inlet manifold 260 and thence into reaction zones I$b$ and I$c$, the catalyst in reaction zone I$a$ is regenerated. To regenerate the catalyst in any reaction zone such as reaction zone I$a$, the reaction zone vapor inlet valve and the reaction zone effluent valve are closed isolating the reaction zone from the vapor inlet manifold and the effluent manifold with which the reaction zone is associated.

Flue gas substantially devoid of oxygen is circulated from generator 350 to regenerating gas main 310 as described hereinbefore and thence through conduit 382 (valve 381 open) to waste gas main 329 until it is certain that the differential pressure controller 384 is functioning to maintain a pressure in reaction zone I$a$ above the bed of catalyst about 5 to about 25, preferably 5 to 10 p.s.i. higher than the pressure in vapor inlet manifold 260. When differential pressure controller 384 is so functioning plug valve 271 is closed, valve 381 is slowly closed while valve 320 is opened and flue gas substantially devoid of free oxygen flows from regenerating gas main 310 through branch 311, the stem of plug valve 271 into and through reaction zone I$a$ to effluent valve 280 and effluent manifold 266. In effluent manifold 266 the flue gas and hydrocarbons and hydrogen purged from reaction zone I$a$ mix with the effluent of reaction zones I$b$ and I$c$ and flow as a first effluent through conduit 295 to coil 296 as previously described in conjunction with the description of the flow of the first effluent.

After a volume of flue gas equal to about two to six times the volume of reaction zone I$a$ has passed through reaction zone I$a$, the reaction zone is purged. Plug valve 280 is then closed and valve 339 in branch 330 of waste gas main 329 is opened isolating reaction zone I$a$ from effluent manifold 266. With reaction zone I$a$ isolated from both inlet manifold 260 and effluent manifold 266 flue gas substantially devoid of oxygen is passed through reaction zone I$a$ to waste gas main 329 for about thirty minutes more, i.e., about 2 to 6 volumes additional based upon the volume of reaction zone I$a$. Thereafter, oxygen or oxygen-containing gas is mixed with the flue gas in conduit 356 under regulation by oxygen controller 359 to provide a concentration of oxygen in the gas in regenerating gas main 310 of about 0.5 percent by volume.

When combustion is initiated in the bed of catalyst in reaction zone I$a$ the concentration of oxygen in the flue gas is gradually raised to not more than about 1.0 percent by volume while limiting the temperature in the catalyst bed to a maximum of about 850° F. when the temperature of the gas in branch 330 of the waste gas main is not substantially higher than the temperature of the gas in regenerating gas main 310 or when oxygen is detected in the gas entering the waste gas main the regeneration of the catalyst in reaction zone I$a$ is complete. The reaction zone is then purged with flue gas substantially devoid of oxygen until about 5 to about 10 volumes of flue gas based upon the volume of reaction zone I$a$ have passed therethrough. Valve 381 is then opened and valves 320 and 339 closed. Thereafter, valves 271 and 280 are opened putting reaction zone I$a$ back on stream. Thereafter, as the condition of the catalyst in the other reaction zones requires, the catalyst in reaction zones I$b$, I$c$, II$a$, II$b$, II$c$, III$a$, III$b$ and III$c$ is regenerated in any sequence in the manner described hereinbefore.

From the foregoing description of presently preferred methods of reforming a mixture of hydrocarbons in the presence of hydrogen in a plurality of static beds of particle-form solid reforming catalyst, preferably platinum-group metal reforming catalyst and particularly platinum reforming catalyst and presently preferred apparatus for practicing the aforesaid novel method of reforming, those skilled in the art will understand that the present invention is a method of reforming hydrocarbon mixtures in the presence of hydrogen and reforming catalyst in a plurality of reaction stages each having a plurality of reaction zones wherein the catalyst in at least one reaction zone but not more than one reaction zone in any reaction stage is being regenerated contemporaneously with the reforming of hydrocarbon mixture in the other reaction zones the catalyst in which is not being regenerated and a novel apparatus for practicing the aforesaid invention. Those skilled in the art will also recognize that the present invention comprises establishing in each reaction stage a plurality of at least three reaction zones, charging each of said reaction zones with particle-form solid reforming catalyst, the total amount of said charged catalyst being greater than the amount of said catalyst required to provide the foresaid stage space velocity and the total amount of said catalyst in less than all of said reaction zones in a reaction stage being sufficient to provide the aforesaid stage space velocity, in all reaction stages passing said charge mixture in parallel through a plurality of selected on-stream reaction zones to provide said stage velocity, excluding said charge mixture from the remainder of the reaction zones in a reaction stage, designated off-stream reaction zones, withdrawing reaction products from each of said selected on-stream reaction zones in a reaction stage as a reaction stage effluent, producing in said selected on-stream reaction zones a carbonaceous deposit on said catalyst confined therein, in a cyclic manner selectively discontinuing the flow of charge mixture to at least one of said selected on-stream reaction zones, designated hybrid reaction zone, in at least one reaction stage, introducing charge mixture selectively into the number of purged off-stream reaction zones in addition to selected on-stream reaction zones remaining on-stream in each reaction stage to maintain the aforesaid stage space velocity, and contemporaneously sequentially purging said hybrid reaction zone, passing regenerating medium through said purged hybrid reaction zone, and purging said hybrid reaction zone to provide purged off-stream reaction zone.

I claim:

1. In the method of reforming naphtha wherein a charge mixture comprising naphtha and hydrogen is contacted successively in a plurality of adiabatic reaction stages with particle-form solid reforming catalyst at reforming conditions of temperature, pressure, and liquid hourly space velocity, wherein the overall liquid hourly space velocity for all stages is in the range of about 0.2 to about 10 and the stage space velocity in each stage is greater than the existing overall liquid hourly space velocity wherein the effluent of each reaction stage is reheated to reforming temperature prior to introduction into a succeeding reaction stage, wherein the effluent of the final reaction stage is separated into reformer gas comprising hydrogen and $C_1$ to $C_3$ hydrocarbons and reformate comprising $C_4$ and heavier hydrocarbons, wherein at least a portion of asid reformer gas is recycled to said reaction stages, wherein in an on-stream period carbonaceous material is deposited on said catalyst, wherein the amount of said deposited carbonaceous material in at least one reaction stage reduces the activity of said catalyst therein to an impractical level, completes the on-stream period and initiates an off-stream period, wherein charge mixture is excluded from said reaction stage during said off-stream period, and wherein the activity of the catalyst in said off-stream reaction stage is restored to a practical level by decomposition of said carbonaceous material in a regeneration medium during said off-stream period, the improvement which comprises establishing in each of the aforesaid reaction stages a plurality of at least three reaction zones, charging each of said reaction zones with particle-form solid reforming catalyst, the total amount of said charged catalyst being greater than the amount of said catalyst required to provide the aforesaid stage space velocity and the total amount of said catalyst in less than all of said reaction zones in a reaction stage being sufficient to provide the aforesaid stage space velocity, in all reaction stages passing said charge mixture in parallel through a plurality of selected on-stream reaction zones to provide said stage space velocity, excluding said charge mixture from the remainder of the reaction zones in a reaction stage, designated off-stream reaction zones, withdrawing reaction products from each of said selected on-stream reaction zones in a reaction stage as a reaction stage effluent, producing in said selected on-stream reaction zones a carbonaceous deposit on said catalyst confined therein, in a cyclic manner selectively discontinuing the flow of charge mixture to at least one of said selected on-stream reaction zones, designated hybrid reaction zone, in at least one reaction stage, introducing charge mixture selectively into the number of purged off-stream reaction zones in addition to selected on-stream reaction zones remaining on-stream in each reaction stage to maintain the aforesaid stage space velocity, and contemporaneously sequentially purging said hybrid reaction zone, passing regenerating medium through said purged hybrid reaction zone, and purging said hybrid reaction zone to provide purged off-stream reaction zone.

2. The method described and set forth in claim 1 wherein the particle-form solid reforming catalyst is platinum-group metal reforming catalyst, and wherein the reforming pressure is in the range of about 15 to about 300 p.s.i.g.

3. The method described and set forth in claim 1 wherein the particle-form solid reforming catalyst is platinum-group metal reforming catalyst, wherein the reforming pressure is in the range of about 15 to about 300 p.s.i.g. and wherein purge gas and regenerating medium flow through said hybrid reaction zone at a pressure in the range of about 5 to about 25 p.s.i. greater than the pressure in the selected on-stream reaction zones.

4. The method described and set forth in claim 1 wherein purge gas and regenerating medium flow through said hybrid reaction zone at a pressure in the range of about 5 to about 25 p.s.i. greater than the pressure in the selected on-stream reaction zones and wherein during the purge of said hybrid reaction zone of hydrocarbon vapors about 2 to 6 volumes of purge gas flow from the aforesaid hybrid reaction zone with the effluent of said selected on-stream reaction zones.

5. The method described and set forth in claim 4 wherein the volume of purge gas passed through said hybrid reaction zone during each purge is at least twice the volume of said empty hybrid reaction zone.

6. In a horizontal cylindrical tank for catalytic hydrocarbon conversion at pressures up to 1000 p.s.i.g. in which hydrocarbon conversions the activity of the catalyst is reduced by deposition thereon of a carbonaceous material during an on-stream period and the activity of said catalyst is restored to a practical level during an off-stream period by decomposition of said carbonaceous material in a stream of regenerating medium, said tank having (1) an end plate mounted vertically to the horizontal axis of said tank in a vapor-tight manner contiguous to each end of said tank, (2) a plurality of spaced apart plates mounted vertically to the aforesaid horizontal axis in a vapor-tight manner between the aforesaid end plates and constructed and arranged to provide a plurality of vapor-tight major compartments, (3) a reactant inlet mounted in a vapor-tight manner in a quadrant above the aforesaid horizontal axis in each of said major compartments, and (4) a reaction products outlet mounted in a vapor-tight manner in a quadrant below the aforesaid horizontal axis in each of said major compartments, the combination comprising in each of said major compartments a first horizontal plate, having a plurality of inlet ports, mounted above said horizontal axis, in a vapor-tight manner parallel to said horizontal axis, and constructed and arranged to form with the contiguous wall of said tank a reactant inlet manifold; in each of said major compartments a second horizontal plate, having a plurality of outlet ports, mounted below said horizontal axis, in a vapor-tight manner, parallel to said horizontal axis, and constructed and arranged to form with the contiguous wall of said tank a reaction products outlet manifold; in each of said major compartments a plurality of spaced apart plates mounted in a vapor-tight manner between said first and second horizontal plates, and constructed and arranged to form a plurality of vapor-tight minor compartments therein each of which have fluid communication with the reactant inlet manifold of its major compartment through only one of said inlet ports and fluid communication with the reaction products outlet manifold of its major compartment through only one of said outlet ports; a thin walled inlet cylinder, deformable at operating temperatures of about 800° to about 1000° F. mounted in each of said inlet ports in a vapor-tight manner, a thin-walled outlet cylinder deformable at the aforesaid operating temperatures mounted in each of said outlet ports in a vapor-tight manner; a first minor compartment sealing means mounted above and vertically spaced apart from each of said inlet cylinders and concentric therewith; a second minor compartment sealing means mounted below and vertically spaced apart from and concentric with each of said outlet cylinders; said first and said second minor compartment sealing means comprising a regenerating conduit resistant to substantial longitudinal compression mounted in a port in said tank in a sliding, substantially vapor-tight manner, a tapered plug mounted in a vapor-tight manner on the inner end of said regenerating conduit and concentric therewith, said plug having a maximum outside diameter greater than and a minimum outside diameter less than the inside diameter of a thin-walled cylinder and being resistant to substantial deformation when forced into a thin-walled cylinder, and means external of said tank constructed and arranged for thrusting said plug into a thin-walled cylinder to form a substantially vapor-tight joint and for withdrawing said plug from said thin-walled cylinder, said first and second minor compartment sealing means being constructed and arranged for flow of reactants into and reaction products out of selected minor compartments in a major compartment and for flow of regenerating medium into and products of regeneration out of the balance of the minor compartments in said major compartments without substantial mixing of reactants and reaction products with regenerating medium and products of regeneration.

7. In the horizontal cylindrical tank for catalytic hydrocarbon conversion at pressures up to 1000 p.s.i.g. as described and set forth in claim 6 in each minor compartment a foraminous plate mounted above said second horizontal plate below said horizontal axis.

References Cited in the file of this patent

UNITED STATES PATENTS

| | | |
|---|---|---|
| 2,028,326 | Hanks et al. | Jan. 21, 1936 |
| 2,173,984 | Shapleigh | Sept. 26, 1939 |
| 2,229,829 | Watson | Jan. 28, 1941 |
| 2,254,472 | Dahl | Sept. 2, 1941 |
| 2,378,607 | Watts | June 19, 1945 |
| 2,573,149 | Kassel | Oct. 30, 1951 |
| 2,578,704 | Houdry | Dec. 18, 1951 |
| 2,666,692 | Dolezal et al. | Jan. 19, 1954 |
| 2,773,014 | Snuggs et al. | Dec. 4, 1956 |
| 2,901,414 | Kelly | Aug. 25, 1959 |
| 2,908,653 | Hengstebeck | Oct. 13, 1959 |